United States Patent [19]

Bullen

[11] Patent Number: 5,028,680
[45] Date of Patent: Jul. 2, 1991

[54] CROSSLINKABLE SILYL POLYMER COMPOSITION

[75] Inventor: David J. Bullen, Hackettstown, N.J.

[73] Assignee: BP Chemicals Limited, London, England

[21] Appl. No.: 379,247

[22] Filed: Jul. 12, 1989

[30] Foreign Application Priority Data

Jul. 13, 1988 [GB] United Kingdom ............... 8816658

[51] Int. Cl.$^5$ ............................................ C08G 77/06
[52] U.S. Cl. .................................. 528/15; 525/100; 526/279; 528/18; 528/19
[58] Field of Search ............... 525/100; 528/15, 18, 528/19; 526/279

[56] References Cited

U.S. PATENT DOCUMENTS

| | | | |
|---|---|---|---|
| 4,614,766 | 9/1986 | Schimmel et al. | 525/104 |
| 4,689,369 | 8/1987 | Ishino et al. | 525/100 |

FOREIGN PATENT DOCUMENTS

| | | |
|---|---|---|
| 0050982 | 5/1982 | European Pat. Off. . |
| 884660 | 12/1961 | United Kingdom . |
| 2188640 | 10/1987 | United Kingdom . |

*Primary Examiner*—Melvyn I. Marquis
*Attorney, Agent, or Firm*—Brooks Haidt Haffner & Delahunty

[57] ABSTRACT

The inclusion of an ester of dipentaerythrital and one or more $C_4$ to $C_8$ carboxylic acids in a composition comprising a silyl polymer and an organometallic silanol condensation catalyst, decreases the tendency of the composition to undergo premature crosslinking during the fabrication of articles therefrom. The invention includes compositions crosslinkable by the action of water comprising a silly polymer, the ester and an organometallic silanol condensation catalyst and also processes for the preparation of the compositions.

11 Claims, No Drawings

CROSSLINKABLE SILYL POLYMER COMPOSITION

The present invention relates to crosslinkable organic polymer compositions. More particularly the present invention is concerned with crosslinkable compositions comprising organic polymers containing hydrolysable silane groups, which polymers can be thermoformed into shaped articles, for example cable insulation or pipe, and subsequently crosslinked by contacting the articles with water or steam in the presence of a so-called "silanol condensation catalyst".

It is known that organic polymers containing hydrolysable silane groups can be crosslinked by the action of water, preferably in the presence of a silanol condensation catalyst. A number of methods are known for producing such crosslinkable organic polymers. One method comprises copolymerising unsaturated organic monomers, for example, ethylenically unsaturated or vinyl monomers, with unsaturated silane compounds containing hydrolysable groups. Examples of this method are described in GB-A-2028831 and GB-A-2039513 which disclose the preparation of crosslinkable copolymers of ethylene and an ethylenically unsaturated silane compound by copolymerising the monomers at relatively high temperatures and pressures in the presence of a free radical polymerisation initiator. Another example of this copolymerisation method is described in GB-A-1415194 which discloses the preparation of crosslinkable copolymer by contacting ethylene and a terminally unsaturated silane compound, optionally with other olefinically unsaturated comonomer, with certain defined Ziegler catalysts under polymerisation conditions which preferably employ relatively low temperatures and pressures.

It is also known that polymers crosslinkable by the action of water and a silanol condensation catalyst can be prepared by grafting an unsaturated silane compound on to a preformed polymeric material. Grafting processes of this type can be carried out by heating together a base polymer, for example polyethylene, an unsaturated silane compound bearing one or more hydrolysable groups, a grafting initiator and optionally a silanol condensation catalyst, under conditions such that the unsaturated silane compound is grafted on to the base polymer. Examples of this method are disclosed in GB-A-1357549, GB-A-1234034 and GB-A-1286460. Examples of commercial processes which employ a grafting reaction of this type are the SIOPLAS and the MONOSIL processes. (SIOPLAS and MONOSIL are registered trade marks). In the SIOPLAS process, the base polymer is heated with the unsaturated silane in the presence of a grafting initiator and the product is extruded and pelleted to produce a pelleted silane-grafted thermoplastic polymer. The pelleted polymer can then be fed with a silanol condensation catalyst to a thermoforming process for fabricating shaped products. These shaped products are then crosslinked by exposure to water or steam. In the MONOSIL process, the base polymer, the unsaturated silane, the grafting initiator and the silanol condensation catalyst are fed simultaneously to a special extruder in which grafting occurs "in situ" and crosslinkable products, e.g. cable or pipe, are directly extruded. These products can be crosslinked by exposure to steam or water under the influence of the silanol condensation catalyst.

Other known methods for forming polymeric materials having hydrolysable silane groups are the "transesterification" methods wherein a copolymer having exchangeable functions such as alkoxy groups (as, for example, in ethylene/ethyl acrylate copolymer) or carboxylate groups (as, for example, in ethylene/vinyl acetate copolymer) is treated with a suitable silane compound in the presence of a special ester-exchange catalyst.

For example, European patent application 4752 discloses a method for the production of water-curable silane-modified alkylene-alkyl acrylate copolymers which comprises reacting an alkylene-alkylacrylate copolymer, e.g. ethylene-ethyl acrylate, with a silane in the presence of an organotitanate catalyst, e.g. titanium tetraisopropylate. Examples of suitable silane compounds which can be used in this method are acetoxy propyl trimethoxy silane, acetoxy propyl triethoxy silane, methacryloxypropyl trimethoxy silane, acryloxypropyl trimethoxy silane, methacryloxypropyl triethoxysilane and acryloxypropyl triethoxy silane. In another example of the transesterification method ethylene/vinyl acetate copolymer can be reacted with a suitable silane compound bearing hydrolysable groups and having esterified carboxylic acid groups which exchange with the acetate groups on the copolymer. A suitable silane compound is 4-[tri(m)ethoxysilyl] butanoic acid (m)ethyl ester.

Polysiloxane-modified copolymers prepared by reacting a mixture containing an alkylene-alkyl acrylate copolymer and a polysiloxane in the presence of an organo titanate catalyst are also known. For example, European Patent No. 49 155 discloses the production of such polysiloxane-modified copolymers and European patent application EP 120 115 discloses compositions comprising a polysiloxane and an organo titanate and the use thereof in the production of such polysiloxane-modified alkylene-alkyl acrylate copolymers.

Although the polysiloxane-modified alkylene-alkylacrylate copolymers are water-curable, they have a very different molecular structureto those polymers prepared using monomeric silanes. According to European patent No. 49 155, the advantage of using a polysiloxane is that the polysiloxane-modified alkylene-alkyl acrylate copolymers produced are free of undesirable volatiles.

The present invention relates to crosslinkable organic polymers having pendant, hydrolysable silane groups which are not derived from a polysiloxane. These polymers, which are hereinafter referred to as "silyl polymers" can be prepared, as described above, by copolymerising unsaturated organic monomers with unsaturated silane compounds containing hydrolysable groups, by grafting an unsaturated silane compound on to a preformed polymeric material or by the transesterification methods using a monomeric silane, e.g. as disclosed in European patent application 4752. The silyl polymers can be fabricated to form a large variety of useful articles by conventional techniques, for example, extrusion, injection moulding, blow-moulding and film-blowing processes. The crosslinking step is generally carried out subsequent to fabrication of the article because the crosslinked polymer cannot in general be satisfactorily thermoformed.

A problem encountered with silyl polymers is that during thermoforming operations the polymer can undergo premature crosslinking which can lead to difficulties in the fabrication of articles from the polymer or to the production of articles having unsatisfactory physical and mechanical properties. The problem is particularly serious in the production of extruded wire and cable insulation wherein it is important to provide an extruded layer of insulation which is substantially free from surface roughness. Wire or cable insulation which has a relatively rough surface can suffer mechanical damage (for example, tearing and snagging) leading to insulation failure. The roughness can also lead to electrical stress and insulation breakdown in higher voltage applications.

One method of reducing premature crosslinking proposed in GB-A-1357549 is to mould or extrude articles from silyl polymers in the absence of the silanol condensation catalyst and then to contact the produced article with an aqueous dispersion or solution of a tin carboxylate to cause the crosslinking. However, in many applications it is preferred to include the silanol condensation catalyst as a component of the polymer composition as this leads in general to higher crosslinking rates and to more complete crosslinking particularly in articles having thick cross section.

It is an object of the present invention to provide a crosslinkable silyl polymer composition which exhibits a reduced tendency to undergo premature crosslinking during the fabrication of articles therefrom.

Accordingly, one aspect of the present invention provides a composition capable of being crosslinked by the action of water comprising (A) a silyl polymer,
(B) an ester of dipentaerythritol and a one or more $C_4$ to $C_8$ carboxylic acids, and
(C) an organometallic silanol condensation catalyst.

The silyl polymer employed in the composition of the present invention is, as mentioned above, an organic polymer containing pendant hydrolysable silane groups which are not derived from a polysiloxane which is crosslinkable by the action of water in the presence of a silanol condensation catalyst. In particular, the silyl polymer can substantially comprise polymerised olefin units. Preferably the silyl polymer is an ethylene polymer containing pendant, hydrolysable silane groups. Such ethylene polymers can comprise up to 30% by weight of monomer units other than silane units. Preferably however, the ethylene polymer comprises less than 10% by weight of such other monomers. Most preferably, the silyl polymer is a copolymer of ethylene units and silane units only. Examples of suitable silyl polymers and references to their methods of manufacture are described above. Preferred silyl polymers are those prepared by copolymerising ethylene and an unsaturated silane compound having one or more hydrolysable groups preferably in the presence of a free radical initiator and optionally together with one or more other monomers copolymerisable therewith, or those prepared by graft copolymerising an unsaturated silane on to a base polymer in the presence of a grafting initiator. Particularly preferred silyl polymers are those prepared by copolymerising ethylene and an unsaturated silane compound having one or more hydrolysable groups, optionally together with one or more other unsaturated compounds, at a temperature of 150° to 400° C. and a pressure of 1000 to 4000 bar (100 to 400 MPa) in the presence of a free radical polymerisation initiator.

The unsaturated silane compound employed in such processes is preferably a compound having the general formula $XSiX^1{}_nY_{3-n}$ wherein X represents an ethylenically unsaturated hydrocarbyl or hydrocarbyloxy group; $X^1$ represents an aliphatic saturated hydrocarbyl group; Y represents a hydrolysable organic group; and n represents zero, 1 or 2. X can be, for example, vinyl, allyl, isopropenyl, butenyl, cyclohexenyl or gamma-methacryloxypropyl. Y can be, for example, methoxy, ethoxy, formyloxy, acetoxy, propionyloxy, alkylamino or arylamino. $X^1$ can be, for example, methyl, ethyl, propyl, hexyl, octyl, decyl or phenyl. X is preferably a vinyl group, Y is preferably methoxy, ethoxy or acetoxy. Preferred unsaturated silane compounds are vinyl trimethoxy silane, vinyl triethoxy silane and vinyl triacetoxy silane.

The silyl polymer suitably contains 0.1–10 weight %, preferably 0.5 to 5 weight %, more preferably 0.7 to 2 weight % of copolymerised or grafted units of the unsaturated silane compound (based on silyl polymer).

Esters suitable for use in the compositions according to the present invention include those which are representable by the general formula:

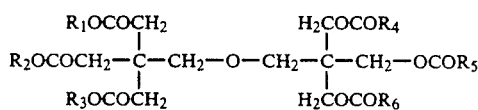

in which $R_1$, $R_2$, $R_3$, $R_4$, $R_5$ and $R_6$ are individually $C_4$ to $C_8$ linear or branched alkyl groups.

Preferably, the groups $R_1$, $R_2$, $R_3$, $R_4$, $R_5$ and $R_6$ are selected from $C_4$, $C_6$ and $C_8$ alkyl groups and the ester preferably comprises a mixture of such alkyl groups. An ester of dipentaerythritol and a mixture of $C_4$, $C_6$ and $C_8$ carboxylic acids is commercially available from BP Chemicals Limited under the trade designation Bisoflex OBC (BISOFLEX is a trade mark).

The ester preferably has a boiling point at 500 Pa of at least 200° C., more preferably at least 220° C. Preferably it is a liquid at or below 20° C. The viscosity of the ester is preferably less than 300 mPa.s at 20° C. and less than 15 mPa.s at 100° C.

The molar ratio of the quantities of silanol condensation catalyst to ester is suitably in the range 1:10 to 3:1, preferably in the range 1:6 to 2:1, more preferably 1:6 to 1:3.

Particular combinations of the ester with other components which form useful "precursors" to the composition of the present invention can comprise, for example;

1. A blend of the ester with a silanol condensation catalyst.
2. A blend of the ester with a hydrolysable unsaturated silane compound, a peroxide grafting initiator and a silanol condensation catalyst.
3. A masterbatch comprising the ester and a suitable polymeric carrier, for example, low density polyethylene.
4. A masterbatch comprising the ester, the silanol condensation catalyst and a suitable polymeric carrier, for example low density polyethylene.

The masterbatches may optionally contain other ingredients, for example antioxidant or process stabilisers and the like.

The precursor (1) can be used for example for the direct introduction of the ester and silanol condensation catalyst into an ethylene/unsaturated silane copolymer or into a graft polymer of polyethylene with an unsaturated silane during melt processing. The precursor (2) can be used, for example, for the direct production of crosslinkable articles based on graft polymer or polyethylene with unsaturated silane using for example extrusion apparatus of the type described in GB-A-1526398 (BICC Limited and Etablissements Maillefer SA).

Precursor 3 can, for example, be blended with a masterbatch of a silanol condensation catalyst and a silyl polymer before or during melt processing to form an article. Similarly, Precursor 4 can be blended with a silyl polymer before or during melt processing to form an article.

Any of the organometallic silanol condensation catalysts known in the art for crosslinking silyl polymers can be suitably employed in the present invention. They can be used in the quantities conventionally employed. Examples of suitable classes of organometallic silanol condensation catalysts are, for example complexes or carboxylates of lead, cobalt, iron, nickel, zinc and tin. Specific examples of the silanol condensation catalyst are dibutyl tin dilaurate, dibutyl tin diacetate, dibutyl tin dioctoate, stannous acetate, stannous caprylate, lead naphthenate, zinc caprylate, cobalt naphthenate; carboxylates of tin are preferred. Particularly preferred silanol condensation catalysts are dialkyl tin carboxylates, for example dibutyl tin dilaurate, dibutyl tin dipalmitate, dibutyl tin distearate, dioctyl tin dilaurate and dibutyl tin maleate.

The quantity of silanol condensation catalyst employed in the crosslinkable composition of the present invention is suitably in the range 0.0001 to 0.5 moles, preferably in the range 0.0005 to 0.05 moles per mole of hydrolysable silyl units in the silyl polymer.

Generally speaking, the quantity of the silanol condensation catalyst is in the range from 0.01 to 5% by weight, most preferably 0.03 to 0.2% by weight, relative to the quantity of silyl polymer in the composition.

The composition of the present invention comprising the silyl polymer, the ester of dipentaerythritol and mixture of $C_4$ to $C_8$ carboxylic acids and the silanol condensation catalyst and/or any other ingredients of the composition, can be prepared by a variety of techniques including, for example, direct blending or compounding of the ingredients, the use of masterbatch techniques or by forming the silyl polymer by grafting techniques "in situ" in the presence of the ester or by direct injection of a mixture comprising the ester and the silanol condensation catalyst into the silyl polymer melt.

The present invention includes a process for preparing a composition capable of being crosslinked by the action of water comprising blending together (A) a silyl polymer
(B) an ester of dipentaerythritol and one or more $C_4$ to $C_8$ carboxylic acids, and
(C) an organometallic silanol condensation catalyst.

The invention also includes a process for preparing a composition capable of being crosslinked by the action of water comprising blending together (A) components which when reacted together form a silyl polymer
(B) an ester of dipentaerythritol and one or more $C_4$ to $C_8$ carboxylic acids, and
(C) an organometallic silanol condensation catalyst.

and subjecting the blend to conditions such that the components (A) react to form a silyl polymer. The components which when reacted together form a silyl polymer can be, for example, a polymer, such as polyethylene, an unsaturated silane compound having one or more hydrolysable groups and a grafting initiator which when reacted together form a graft copolymer. Alternatively, the components can be those which form a silyl polymer by transesterification.

The composition can be prepared for example by contacting the silyl polymer in granular form (e.g. powder or pellets) with the ester and organometallic silanol condensation catalyst under conditions such that the ester and silanol condensation catalyst are absorbed by the polymer granules. If desired, other additives, for example antioxidant can be absorbed into the polymer using the same type of "soaking" technique. Thus, if desired, the granular polymer can be tumbled with a mixture of ester, silanol condensation catalyst and antioxidant until absorption of the ingredients is substantially complete. The rate of absorption can be increased by the use of elevated temperatures and/or intensive mixing if desired. Optionally, an absorbent filler such as, for example, chalk, silica or talc, can be employed to assist absorption of the catalyst and ester into the composition.

In a further method of making the composition of the present invention, the ester and the silanol condensation catalyst and optionally any other ingredients which it is desired to incorporate in the composition, can be included in a masterbatch, prior to compounding the masterbatch with the silyl polymer or with components which react together to form the silyl polymer "in situ".

In the case that the silyl polymer is prepared by grafting the unsaturated silane on to a base polymer, for example low density polyethylene, linear low density polyethylene, ethylene/ethyl acrylate copolymer or ethylene/vinyl acetate copolymer, the ester can, for example, be incorporated into the base polymer prior to or during the performance of the grafting reaction.

A crosslinkable composition according to the present invention comprising the silyl polymer, the ester, the silanol condensation catalyst and, optionally other ingredients, can for example be prepared directly in the form of crosslinkable finished articles by extruding a base polymer, e.g. polyethylene, together with the ester, an unsaturated silane compound of the type described earlier in this specification, a free radical catalyst, i.e. initiator for grafting (e.g. an organic peroxide) and a silanol condensation catalyst. This method can be applied for example in the well-known MONOSIL (RTM) process for the production of insulated wire and cable.

The composition of the present invention can contain additives conventionally employed in the art. Examples of such additives are antioxidants, fillers, metal deactivators (e.g. salicylaldehyde oxime or a hydrazine), lubricants, water-tree inhibitors, foaming agents, flame retardants and pigments. Additives of this type are conventionally incorporated into the composition either directly or by a masterbatching technique.

The composition can also be blended with other compatible polymeric materials, for example, polyethylene, polypropylene, ethylene/ethyl acrylate copolymer and ethylene/1-olefin copolymer (e.g. LLDPE).

The composition of the present invention can be used to manufacture crosslinked products using the technology known in the manufacture of articles from conventional silyl polymers. For example, the composition can be used in blow-moulding, injection-moulding, film-blowing, calendering, extrusion, roto-moulding and extrusion-coating techniques. The composition is particularly preferred for wire and cable coating applications. Wire and cable insulation produced by extrusion coating using the composition of the present invention exhibits improved surface finish.

The invention includes the use of an ester of dipentaerythritol and one or more $C_4$ to $C_8$ carboxylic acids to inhibit premature crosslinking of a composition comprising a silyl polymer and an organometallic silanol condensation catalyst.

Articles fabricated from the composition of the present invention can be readily crosslinked by exposure to water in the form of liquid, steam or moist air.

The invention is illustrated by the following Examples and Comparative Tests.

EXAMPLES 1 TO 5 AND COMPARATIVE TESTS A AND B

Dibutyl tin dilaurate and an ester of dipentaerythritol and a mixture of $C_4$ to $C_8$ carboxylic acids were mixed together in different amounts to provide a series of mixtures with different molar ratios. The ester was a commercial product sold by BP Chemicals Limited under the trade designation Bisoflex OBC. (BISOFLEX is a trade mark). Bisoflex OBC has a boiling point which is greater than 250° C. at 500 Pa and its viscosity is 170 mPa.s at 100° C. and 9.5 mPa.s at 20° C. The moisture content of each mixture was determined using a Mitsubishi CA-02 moisture meter. The mixtures were then sealed in air-tight vials to prevent further absorption of atmospheric water.

The mixtures were added to 100 g samples of a silane copolymer in sufficient quantity that each of the crosslinkable silyl polymer compositions contained 0.1 parts by weight of the silanol condensation catalyst per one hundred parts by weight of the silane copolymer. The silane copolymer was a copolymer of ethylene and vinyl trimethoxysilane containing 1.5 weight % of copolymerised units of the vinyl trimethoxy silane. Each of the crosslinkable compositions was thoroughly mixed in a stoppered flask using a Microid flask shaker and was then extruded using an 18:1, 1.0 inch (25.4 mm) Brabender extruder fitted with a standard 3:1 compression ratio "polyethylene" screw and 0.25 inch (1.016 mm) rod die. The barrel temperatures of the extruder were set to 140° C., 160° C. and 180° C. from hopper to die. The die itself was maintained at 220° C. The screw speed was 30 rpm, giving a residence time of approximately 3.5 minutes. The extrudate was rapidly cooled by having cold air blown over it. A haul off unit was used to maintain a substantially constant diameter rod extrudate. Between each crosslinkable silyl polymer composition, the extruder was flushed with an additive-free low density polyethylene until no gels were observed in the extrudate. The low density polyethylene had a melt flow index of 0.9 dg/min and a density of 926 kg/m$^3$.

The extrusion conditions were selected to accentuate the effect of precuring so that the beneficial effect of the ester could be more readily appreciated. Forty-eight hours after extruding the crosslinkable silyl polymer compositions, samples were analysed for gel content. The gel content was determined using a test method based on ASTM D 2765 using xylene mixed isomers with a boiling point of 140° C. This provided a measure of the amount of crosslinking which had occurred both during the extrusion and the following 48 hours; as such it can be taken as an indication of the tendency of the composition to undergo curing under ambient conditions, i.e. atmospheric pressure, approximately 20° C. and a relative humidity from 60 to 75%. On the basis of a tactile assessment of the surface of the extrudate of each crosslinkable composition, a representative sample having average roughness was chosen and subjected to a measurement of the surface roughness using a Talysurf 4 measuring device sold by Rank Taylor Hobson (Talysurf is a trade mark). The design of the Talysurf 4 is based on well tried and proved principles and conforms to British Standard 1134:1961. The Talysurf instrument makes use of a sharply pointed stylus to trace the profile of surface irregularities. A flat shoe ar skid provides a datum. The pick-up carrying the stylus and shoe or skid was traversed across the surface of the extrudate for a horizontal distance of 90 mm. Using a transducer the up and down movements of the stylus relative to the shoe or skid were converted into corresponding changes in electric voltage which were amplified and used to control a graph recorder which provided a graphical representation of the profile of the surface of the extrudate. A computer was used to calculate the surface roughness value which is the length of the graphical representation of the profile, in microns, divided by the horizontal length, in millimeters, of the surface traversed by the stylus, i.e. 90 mm.

The surface roughness value and gel content for each of the extruded crosslinkable silyl polymer compositions is given in Table 1. For comparison the results are also given for the silane copolymer alone (Comparative Test A) and for the silane copolymer with 0.1% by weight of dibutyl tin dilaurate but without the ester (Comparative Test B).

The Comparative Tests A and B clearly demonstrate the effect of the silanol condensation catalyst on the surface roughness of the extrudate. Examples 1 to 5 show that this surface roughness can be considerably reduced by the inclusion of an ester of dipentaerythritol and a mixture of $C_4$ to $C_8$ carboxylic acids. The best result was achieved with a ratio of dibutyl tin dilaurate to ester of 1:4.

TABLE 1

| Example or Comparative Test | Molar Ratio of Dibutyl Tin Dilaurate to Aromatic Ester | Moisture Content of Mixture of Dibutyl Tin Dilaurate and Aromatic Ester (ppm) | Gel Content after 48 hours (%) | Surface Roughness |
|---|---|---|---|---|
| A | — | — | 0.2 | 9.26 |
| B | — | 1000 | 44.2 | 45.14 |
| 1 | 1:1 | 800 | 29.1 | 28.64 |
| 2 | 1:2 | 700 | 26.1 | 28.87 |
| 3 | 1:3 | 600 | 27.0 | 26.29 |
| 4 | 1:4 | 600 | 26.2 | 12.22 |
| 5 | 1:5 | 600 | 24.0 | 17.79 |

I claim:

1. A composition capable of being crosslinked by the action of water which comprises:
   (A) a silyl polymer
   (B) an ester of dipentaerythritol and one or more $C_4$ to $C_8$ carboxylic acids, and (C) an organometallic silanol condensation catalyst.

2. A composition as claimed in claim 1 in which the silyl polymer is an ethylene polymer containing pendant hydrolysable groups.

3. A composition as claimed in claim 2 in which the silyl polymer is a polymer prepared by copolymerising ethylene and an unsaturated vinyl silane compound having hydrolysable groups at a temperature of 150° to 400° C. and a pressure of 1000 to 4000 bar in the presence of a free radical polymerisation initiator.

4. A composition as claimed in claim 1 in which the ester is representable by the general formula:

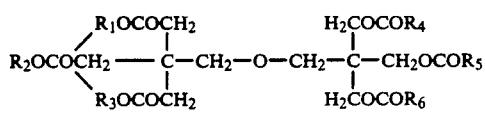

in which the groups $R_1$, $R_2$, $R_3$, $R_4$, $R_5$ and $R_6$ comprise a mixture of $C_4$, $C_6$ and $C_8$ alkyl groups.

5. A composition as claimed in claim 1 in which the molar ratio of the quantities of silanol condensation catalyst to the ester is from 1:10 to 3:1.

6. A composition is claimed in claim 1 which comprises;
    (A) a copolymer of ethylene and an unsaturated silane selected from the group consisting of vinyl trimethoxy silane, vinyl triethoxy silane and vinyl triacetoxy silane,
    (B) an ester of dipentaerythritol and a mixture of $C_4$, $C_6$ and $C_8$ carboxylic acids and
    (C) an organometallic silanol condensation catalyst.

7. A process for preparing a composition capable of being crosslinked by the action of water comprising blending together:
    (A) a silyl polymer,
    (B) an ester of dipentaerythritol and one or more $C_4$ to $C_8$ carboxylic acids, and
    (C) an orgaometallic silanol condensation catalyst.

8. A process for preparing a composition capable of being crosslinked by the action of water comprising blending together:
    (A) components which when reacted together form a silyl polymer,
    (B) an ester of dipentaerythritol and one or more $C_4$ to $C_8$ carboxylic acids, and
    (C) an organometallic silanol condensation catalyst;
    and subjecting the blend to conditions under which the components (A) react to form a silyl polymer.

9. A process for preparing a composition capable of being cross-linked by the action of water comprising blending together:
    (A) components which when reacted together from a silyl polymer, said components comprising a polymer, an unsaturated silane compound having one or more hydrolysable groups and a grafting initiator;
    (B) an ester of dipentaerythritol and one or more $C_4$ to $C_8$ carboxylic acids; and
    (C) an organometallic silanol condensation catalyst;
    and subjecting the blend to conditions under which the components (A) react to form a silyl polymer.

10. A process as claimed in claim 9 wherein the polymer component (A) is a polyethylene.

11. A process as claimed in claim 8 wherein components (A) comprise a silane monomer, a copolymer having exchangeable functions and an ester-exchange catalyst.

* * * * *

UNITED STATES PATENT AND TRADEMARK OFFICE
CERTIFICATE OF CORRECTION

| | | |
|---|---|---|
| PATENT NO. | : | 5,028,680 |
| DATED | : | July 2, 1991 |
| INVENTOR(S) | : | DAVID J. BULLEN |

It is certified that error appears in the above-identified patent and that said Letters Patent is hereby corrected as shown below:

Column 10:

Claim 7, line 7, correct the spelling of the word "organometallic"

Signed and Sealed this

Twenty-fourth Day of November, 1992

Attest:

DOUGLAS B. COMER

*Attesting Officer*    Acting Commissioner of Patents and Trademarks